(No Model.) 2 Sheets—Sheet 1.
M. LEITCH.
THERMOSTATIC VALVE.
No. 604,403. Patented May 24, 1898.
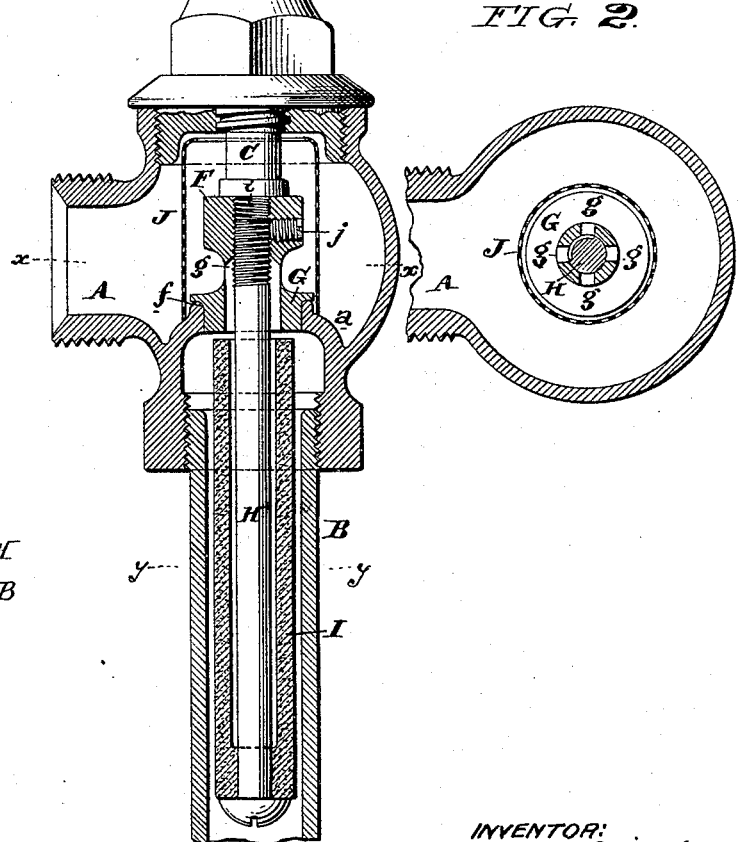
WITNESSES:
Henry Drury
R. M. Kelly
INVENTOR:
Meredith Leitch
By his atty (No Model.) 2 Sheets—Sheet 2.
M. LEITCH.
THERMOSTATIC VALVE.
No. 604,403. Patented May 24, 1898.
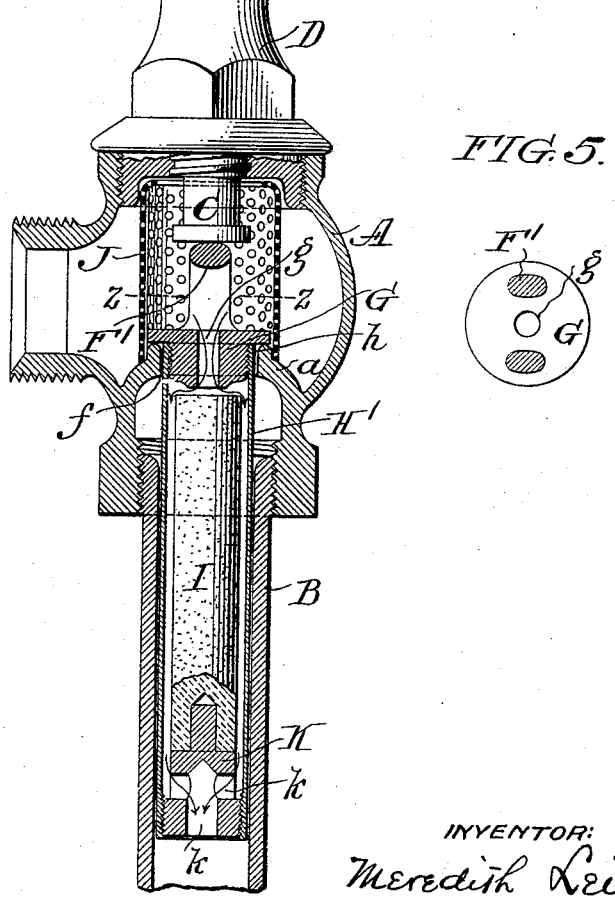
WITNESSES:
INVENTOR:
Meredith Leitch

UNITED STATES PATENT OFFICE.

MEREDITH LEITCH, OF MERCHANTVILLE, NEW JERSEY, ASSIGNOR TO THE WARREN WEBSTER & COMPANY, OF NEW JERSEY.

THERMOSTATIC VALVE.

SPECIFICATION forming part of Letters Patent No. 604,403, dated May 24, 1898.

Application filed November 6, 1897. Serial No. 657,599. (No model.)

*To all whom it may concern:*

Be it known that I, MEREDITH LEITCH, of Merchantville, Camden county, New Jersey, have invented an Improvement in Thermostatic Valves, of which the following is a specification.

My invention relates to thermostatic valves; and it consists of the improvements which are fully set forth in the following specification and are shown in the accompanying drawings.

It is the object of my invention to provide a thermostatic valve for steam-radiators, &c., of simple and efficient construction and particularly such a combination and arrangement of parts as will permit an ordinary hand-valve of standard make to be economically and easily transformed into an efficient thermostatic valve by the addition of thermostatic parts which may be easily and quickly applied without necessitating any material change or alteration in the hand-valve or its removal from the system.

My invention relates both to the thermostatic valve of novel construction, as hereinafter set forth, and also to the construction of the thermostatic parts, whereby they are adapted to be applied to an old valve-body to convert it into a thermostatic valve and to the combination of such thermostatic parts with the old valve-body.

By the improvements herein described I am able to convert an old hand-valve into a thermostatic valve by simply removing the disk from the valve-stem and introducing the new thermostatic parts into the valve-body without otherwise dismantling the valve or removing it from the connecting-pipes.

In the drawings, Figure 1 is a vertical sectional view of a valve embodying my invention. Fig. 2 is a transverse horizontal sectional view of the same on the line $xx$ of Fig. 1. Fig. 3 is a similar view on the line $yy$ of Fig. 1. Fig. 4 is a vertical sectional view similar to Fig. 1, illustrating another form of my invention; and Fig. 5 is a horizontal sectional view of the auxiliary seat-piece on the line 2 2 of Fig. 4.

A is the valve-body, (shown as an ordinary angle-valve,) provided with the internal partition $a$, which constitutes the valve-seat of the ordinary hand-valve and in which the usual valve-aperture is located.

B is a pipe communicating with the valve-body below the partition $a$.

C is the adjustable valve-stem, carried in the bonnet D and provided with the usual wheel E.

Referring first to the construction shown in Figs. 1, 2, and 3, F is a nut carrying an annular seat-piece G, adapted to fit into the opening $f$ in the partition $a$ and provided with one or more passage-ways or apertures $g$, opening through the nut into the annular passage-way in the seat-piece G.

H is a headed bolt or post, the upper end of which is carried by the nut F, preferably adjustable, for which purpose I have shown the threaded end of the bolt or post received in a threaded recess or hole $i$ in the nut. A screw $j$, extending through the nut and bearing upon the threaded end of the bolt, may be used to lock the bolt or post in adjusted position.

The lower end of the stem C abuts against the head of the nut F, thus holding it and the post H in position, with the seat-piece G held firmly upon the partition $a$. The nut thus constitutes an extension or bearing by which the seat-piece may be held in place.

I is the expanding member, consisting of a tubular piece of expansible material surrounding the post H and supported by the head thereof, with its upper end immediately adjacent to and below the seat-piece G, upon which it is adapted to close when elongated by expansion.

The air and water pass into the valve-body A through the apertures $g$ and annular opening in the nut and thence out through the pipe B. When the expanding piece I is expanded by the steam, it closes upon the bottom of the valve-piece G and closes the outlet through the seat-piece until it again contracts. The expanding piece may be readily adjusted by the adjustment of the post H in the nut F.

J is an annular dirt-screen arranged about the nut F to catch the dirt or sediment that may be carried in the valve and prevent it passing into the thermostatic parts.

In the construction shown in Figs. 4 and 5 the seat-piece G is provided with a yoke, bridge, or extension F', which constitutes the bearing upon which the end of the valve-stem C abuts to hold the piece G upon the seat $f$, and instead of the tubular expanding piece carried by the internal post H, I employ a cage or tubular piece H', extending down into the pipe B and connected with the seat-piece G, as by the screw-threads $h$, and supporting at its lower end the expanding piece I within the cage or tube H', with its upper end adjacent to the seat of the seat-piece G. The expanding piece I is preferably supported within the tube or cage H' by a perforate nut K, adjustably carried by the tube, through the perforations $k$ in which the water, air, and vapor may pass into the pipe B, having first passed through the passage $g$ in the seat-piece G into the tube H'. These perforations in the nut K are not required when an open cage is employed. By this construction I may avoid the use of a tubular expanding piece and the consequent liability of minute particles of matter which pass through the screen J (if the screen is used) collecting within the tubular expanding piece and impairing its action. In this construction the expanding piece may be adjusted either by adjusting the cage or tube H' on the seat-piece G or by adjusting the supporting-nut K.

The thermostatic parts, consisting of the nut F, post H, and expanding piece I, as in Figs. 1, 2, and 3, or of the piece G, tube or cage H', and expanding piece I, as in Figs. 4 and 5, may be constructed as a separate article of manufacture, adapted for transforming an old hand-valve into a thermostatic valve. To apply these thermostatic parts to an old hand-valve of the character described, it is necessary simply to detach the bonnet D with the valve-stem, remove the disk, insert the thermostatic parts F H I or G, H', and I, reapply the bonnet, and screw down the valve-stem until it abuts upon the nut F or bridge F'. This application of the invention is of especial advantage in transforming an ordinary steam-heating system into one in which the flow of water, steam, and air from the radiators or coils is controlled by thermostatic valves.

The details of construction shown may be varied without departing from the invention.

What I claim as new, and desire to secure by Letters Patent, is as follows:

1. In a thermostatic valve, the combination of the valve-body provided with an internal aperture, a removable seat-piece located in said aperture, a valve-stem holding said seat-piece in place, and a thermostatic expanding piece supported adjacent to said seat-piece and adapted to close thereon when expanded.

2. In a thermostatic valve, the combination of the valve-body provided with an internal aperture, a removable seat-piece located in said aperture, a valve-stem carried by the body and holding said seat-piece in place, a support carried by said seat-piece, and a thermostatic expanding piece supported by said support and adapted to close upon the seat-piece.

3. In a thermostatic valve, the combination with the valve-body, provided with an internal aperture, of a removable seat-piece, located in said aperture, a support independent of the valve-body carried by said seat-piece and extending below it under the seat-piece, and an expanding piece supported by said support and adapted, when expanded to close upon the under side of the seat-piece.

4. In a thermostatic valve, the combination with the valve-body, provided with an internal aperture, of a removable seat-piece, located in said aperture, a cage independent of the valve-body carried by said seat-piece and extending below it under the seat-piece, and an expanding piece adjustably supported at one end by said cage and adapted, when expanded to close upon the under side of the seat-piece.

5. In a thermostatic valve, the combination with the valve-body, provided with an internal aperture, of a seat-piece, adapted to fit therein and provided with a valve-seat on its under side, a support independent of the valve-body carried by said seat-piece and extending below it, and an expanding piece, carried by said support and adapted to close upon the seat on the under side of said seat-piece.

6. In a thermostatic valve, the combination with the valve-body, provided with an internal aperture, a seat-piece, adapted to fit therein and provided upon its under side with a valve-seat, and upon its upper side with a bearing, an expanding piece, supported from the seat-piece and located below it, and adapted to close upon the valve-seat on the under side of the seat-piece, and means carried by the valve-body and abutting against the bearing of the seat-piece to hold said piece in place.

7. As an article of manufacture, the removable parts for converting a hand-valve into a thermostatic valve, consisting of a seat-piece adapted to fit the aperture in the valve-body, a tubular piece carried by said seat-piece, and a perforated nut adapted to carry a thermostatic expanding piece carried by said tubular piece.

8. As an article of manufacture, the removable parts adapted for converting a hand-valve into a thermostatic valve, consisting of a seat-piece, adapted to fit the aperture in the valve-seat of a valve-body and provided upon its upper face with a bearing extension, and a support for a thermostatic expanding piece, carried by said seat-piece, and extending below it.

9. As an article of manufacture, the removable parts for converting a hand-valve into a thermostatic valve, consisting of a seat-piece adapted to fit the aperture in the valve-body, a tubular piece carried by said seat-piece, a perforated nut carried by said tubular piece, and a thermostatic expanding piece carried by said perforated nut.

10. As an article of manufacture, the removable thermostatic parts of a thermostatic valve, consisting of a seat-piece, adapted to fit the aperture in the valve-seat of a valve-body, and provided upon its upper face with a bearing extension, an extended support carried by the seat-piece and extending below it, and an expanding piece supported by said support and located below the seat-piece and adapted to close on the under side thereof when expanded.

11. As an article of manufacture, the removable thermostatic parts of a thermostatic valve, consisting of a removable seat-piece G provided on its upper side with a bearing extension, a cage H' carried by the seat-piece and extending below it, and an expanding piece I supported at its lower end by the cage H', and having its upper end adjacent to the under side of the seat-piece G and adapted to close thereon when expanded.

12. In a thermostatic valve, the combination with the valve-body provided with an internal aperture, of a removable seat-piece adapted to fit therein, a support independent of the valve-body carried by said seat-piece, and an expanding piece carried by said support and adapted to close on said seat-piece.

In testimony of which invention I hereunto set my hand.

MEREDITH LEITCH.

Witnesses:
ERNEST HOWARD HUNTER,
J. W. KENWORTHY.